United States Patent [19]

Graser

[11] E Re. 29,063

[45] Reissued Dec. 7, 1976

[54] RETURNABLE WRAP-AROUND CARRIER

[75] Inventor: Earl J. Graser, Monroe, La.

[73] Assignee: Olinkraft, Inc., West Monroe, La.

[22] Filed: July 24, 1975

[21] Appl. No.: 598,868

Related U.S. Patent Documents

Reissue of:

[64] Patent No.: 3,747,801
Issued: July 24, 1973
Appl. No.: 185,178
Filed: Sept. 30, 1971

[52] U.S. Cl. ..... 206/141; 206/143; 206/162; 206/178; 229/52 BC

[51] Int. Cl.[2] ..... B65D 75/00; B65D 25/28; B65D 25/22

[58] Field of Search ..... 206/178, 176, 143, 196, 206/200, 147–149, 152, 154, 155, 162–166; 229/40, 51 TS, 52 BC

[56] References Cited

UNITED STATES PATENTS

| | | | |
|---|---|---|---|
| 2,170,230 | 8/1939 | Armstrong | 229/51 TS |
| 2,760,677 | 8/1956 | Arneson | 206/167 |
| 3,688,972 | 9/1972 | Mahon | 229/51 TS |
| 3,750,935 | 8/1973 | Akkerman | 229/51 TS |
| 3,760,978 | 9/1973 | Stone | 229/52 BC |

FOREIGN PATENTS OR APPLICATIONS

| | | |
|---|---|---|
| 652,776 | 11/1962 | Canada |
| 784,566 | 5/1968 | Canada |
| 458,683 | 8/1949 | Canada |
| 909,180 | 9/1972 | Canada |
| 736,809 | 6/1966 | Canada |
| 736,358 | 6/1966 | Canada |
| 842,053 | 5/1970 | Canada |

*Primary Examiner*—William Price
*Assistant Examiner*—Douglas B. Farrow
*Attorney, Agent, or Firm*—Norvell E. Von Behren; C. Emmett Pugh

[57] ABSTRACT

A returnable wrap-around carrier for a plurality of objects such as beer bottles or the like of the type wherein the purchaser of the beer bottles places a deposit on the bottles for the return thereof to the storekeeper. The carrier and the bottles contained therein are completely enclosed affording protection to the bottles from light rays and protection from the bottles dropping out of the carrier. The carrier contains a built-in handle formed partly in the top panel of the carrier and partly in the central interior partition formed within the carrier. When the full pack of bottles [ are ] *is* transported in the carrier to the purchaser's home, both handle means are used. Thereafter the top panel of the carrier may be completely removed from the side panels to expose the central partition handle which may be used to return the carrier and the empty bottles to the store for deposit. Thereafter the returned carrier may be used and reused as a simple basket carrier for distribution to other sources.

10 Claims, 8 Drawing Figures

INVENTOR
EARL J. GRASER
BY Norwell E. Van Bebren
ATTORNEY

INVENTOR
EARL J. GRASER
BY Norwell E. VanBeheren
ATTORNEY

INVENTOR
EARL J. GRASER
BY Norwell E. Van Behren
ATTORNEY

INVENTOR
EARL J. GRASER
BY Morrell E. Van Beheren
ATTORNEY

RETURNABLE WRAP-AROUND CARRIER

Matter enclosed in heavy brackets [ ] appears in the original patent but forms no part of this reissue specification; matter printed in italics indicates the additions made by reissue.

BACKGROUND OF THE INVENTION

This invention relates generally to a wrap-around carrier for bottled objects such as beer or the like and more particularly to a new and novel returnable wrap-around carrier which may be used to carry full bottles from the store to the consumer and may then be reused to carry empty bottles from the consumer to the store. The carrier contains novel means designed into the package for accomplishing this purpose.

In the packaging of beer bottles or the like, it is desirable to package the bottles in a carrier which completely encloses the bottles in order to prevent the sun's rays from having a deteriorating effect on the contents of the bottle as well as providing means for retaining the bottles within the carrier while the carrier is being transported from the store to the consumer's home. It is taught by the prior art devices that such completely enclosed carriers having a generally elongated hole or pair of holes formed in the top panel may be produced, these holes serving as the carrying handle for the package.

In recent years the no-deposit beer bottle has become extremely popular with the purchaser who simply threw away the empty beer bottle as well as the empty package in which the bottles were packed whenever he was finished using both. However, recent trends in marketing today, due [ primary ] *primarily* to ecology considerations, tend to indicate that the no-deposit beer bottle will someday become obsolete, and that the bottlers will return to the two-way deposit bottle which was quite prominent in the marketplace in the early 1960s.

During that time when the returnable beer bottle was being used, attempts were made to provide a carrier such as beforementioned with the carrier having a handle which was torn from the top panel of the carrier and which could be used to transport the carrier and empty bottles back to the store for return of the deposit. Two types of carrier of this design are shown in the U.S. Pat. No. 3,061,141, issued Oct. 30, 1962, to R. A. Cote, and the U.S. Design Pat. No. 188,395, issued July 12, 1960, to Costis J. Paps. Both of these carriers are somewhat similar in design of the handle for the carrier which is torn out of the top panel of the carrier and may be used for transporting the carrier with the empty bottles back to the store. It should become obvious after seeing these two carriers that problems were encountered in reinserting the empty bottles back into the carrier since, more often than not, portions of the top panel of the carrier had to be destroyed in order to get the full bottles out of the package. In addition, if the top panels were not destroyed, it was very difficult to reinsert the empty bottles into the container since they originally were placed in the container with the sides and top panels being formed around the bottles.

SUMMARY OF THE INVENTION

In order to eliminate the problems encountered in the prior art structures [ herebefore ] *hereinbefore* mentioned, there is provided by the subject invention a new and novel returnable wrap-around carrier which has formed partly in the top panel thereof and partly in the interior partition of the carrier, a new and novel handle means which may be used for transporting the carrier from the store to the consumer and also for transporting the carrier, containing the empty bottles, from the consumer back to the store. The new and novel returnable carrier contains a generally elongated hole formed in the top panel of the carrier in proximity to a generally elongated hole formed in the upper portion of the central partition within the carrier. When the carrier is transported with full bottles from the store to the consumer, both elongated holes are used as a means for carrying the package. When the top panel is removed from the carrier at the consumer's home, the elongated hole contained within the central partition member may then be used to transport the carrier, with the empty bottles, back to the store for return of the deposit. Thereafter the carrier may be reused by the bottler as a simple basket-style carrier for distribution to other sources.

Accordingly, it is an object of the invention to provide a new and novel returnable carrier for a plurality of bottles or the like with the carrier being reusable as a simple basket-style carrier to return the empty bottles to the store.

Another object of the invention is to provide a new and novel improved wrap-around carrier having formed, therein, partly in the top panel thereof and partly in the interior partition thereof, a new and novel means for transporting the carrier from the store to the consumer and from the consumer to the store.

Still another object of the invention is to provide a new and novel returnable wrap-around carrier which may be quickly and simply converted to a multi-cell basket carrier, thereby aiding in the ecology of the country by preventing pollution of the countryside from throw-away carrier packages.

Yet another object of the invention is to provide a new and novel returnable wrap-around carrier that may be quickly and economically fabricated with the central interior partition having the new and novel handle means being fabricated either integrally with the remainder of the package or as a separate partition which may be rigidly attached to the side walls and bottom walls of the package.

These and other objects and advantages of the invention will become apparent from a review of the following description of the preferred embodiment as well as a study of the drawings of the application.

DESCRIPTION OF THE PREFERRED EMBODIMENT

Figure 1:
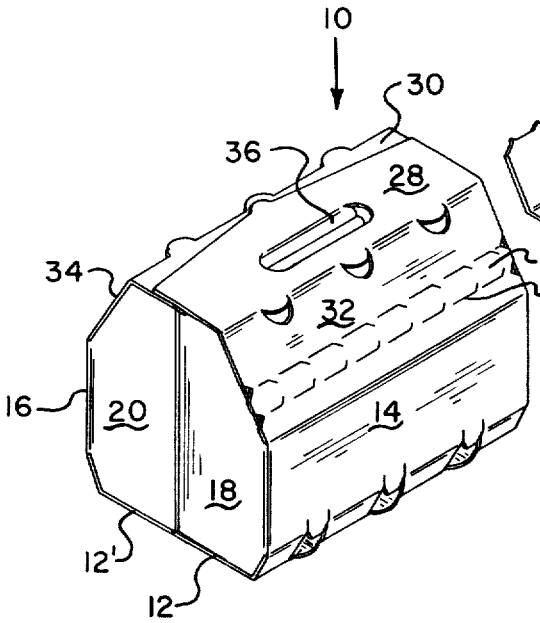
FIG. 1 is a side perspective view of the new and novel returnable wrap-around carrier manufactured in a one piece construction and showing the carrier as totally enclosed and ready for transporting from the store to the consumer.
Figure 2:
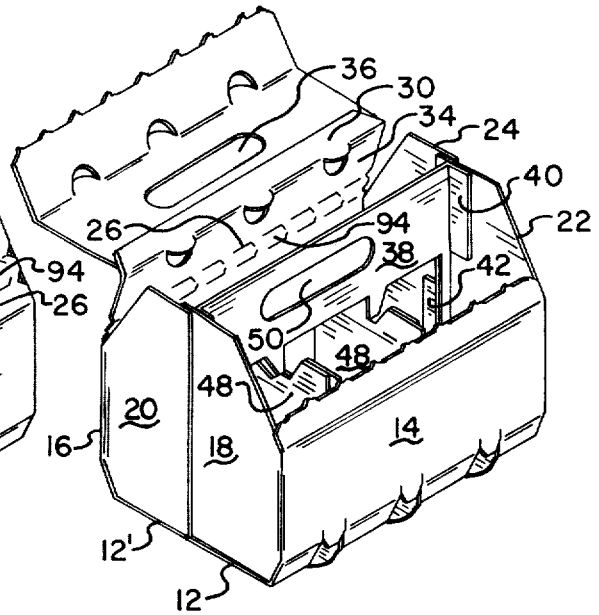
FIG. 2 is a side perspective view of the carrier shown in FIG. 1 showing the top panel partially removed from the carrier and showing the exposed interior handle formed in the upper portion of the central partition contained within the carrier.
Figure 3:
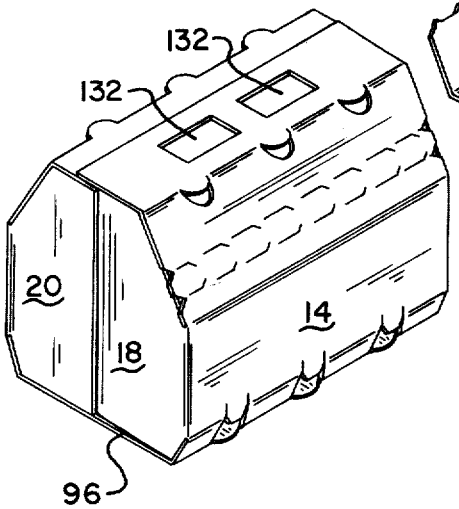
FIG. 3 is a side perspective view of the new and novel returnable wrap-around carrier formed in a two piece construction and ready for transporting of the carrier from the store to the consumer.

Referring now to the drawings in general and in particular to FIGS. 1 and 2 of the drawings, there is shown the new and novel *preferred embodiment of the* returnable wrap-around carrier [ by the numeral ] 10 [ and ] *which* comprises a bottom *formed in part by a first bottom* panel 12 *and a second bottom panel 12'* fixedly attached at [ its ] *their* opposite ends to a pair of *side walls formed by* panels 14 and 16. The carrier 10 also [ contains ] *includes an end wall formed by* a pair of end panels 18 and 20 which are fixedly attached to each other and to the side panels 14 and 16 *respectively* and to the bottom [ panel ] *panels* 12 *and 12', respectively* by means well known in the art. Formed on the other side of the carrier 10, as best shown in FIG. 2 of the drawings, *is a second end wall formed by* a second pair of end panels 22 and 24 which are fixedly attached to each other and to the side panels 14 and 16 *respectively* and to the bottom [ panel ] *panels* 12 *and 12' respectively*, also by means well known in the art.

Removably attached to the side panels 14 and 16 by means of a plurality of tear cuts 26 *is a top cover formed by* a plurality of top panels 28 and 30. The top panels 28 and 30 may be formed with [ a ] sloping [ side ] *sides* 34 and 34, or they may be formed straight as not shown in the drawing but within the spirit and scope of the invention.

The top panel 28 is formed in such a manner as to overlap the top panel 30 and is fixedly attached thereto by means well known in the art, such as glue or the like. The top panel 28 also has formed therein a handle opening 36 which may be used by the purchaser of the package as will be more fully described hereinafter. Formed within the package and integrally therewith is a central partition 38 which is fixedly attached to the end panel 22 by means of a tab 40 and is also fixedly attached to the end panel 24 by means of the tab 42. Although not shown in FIG. 2 but shown in FIGS. 7 and 8 of the drawings, the central partition 38 also contains a second set of tabs 44 and 46 for anchoring the central partition 38 to the end panels 18 and 20.

The central partition 38 also has formed in the lower portion thereof, by means well known in the art, a pair of butterfly panels which are pivotally mounted to the central partition 38 by means well known in the art and forming no part of this invention. The central partition 38, as well as the butterfly panels 48, serve as the means for separating the bottles contained within the carrier from direct contact with each other. Formed on the upper portion of the central partition 38 is a partition handle opening 50 which is in close proximity to the top cover handle opening 36 whenever the top package is completely closed for the reason which will be more fully detailed hereinafter.

Figure 7:
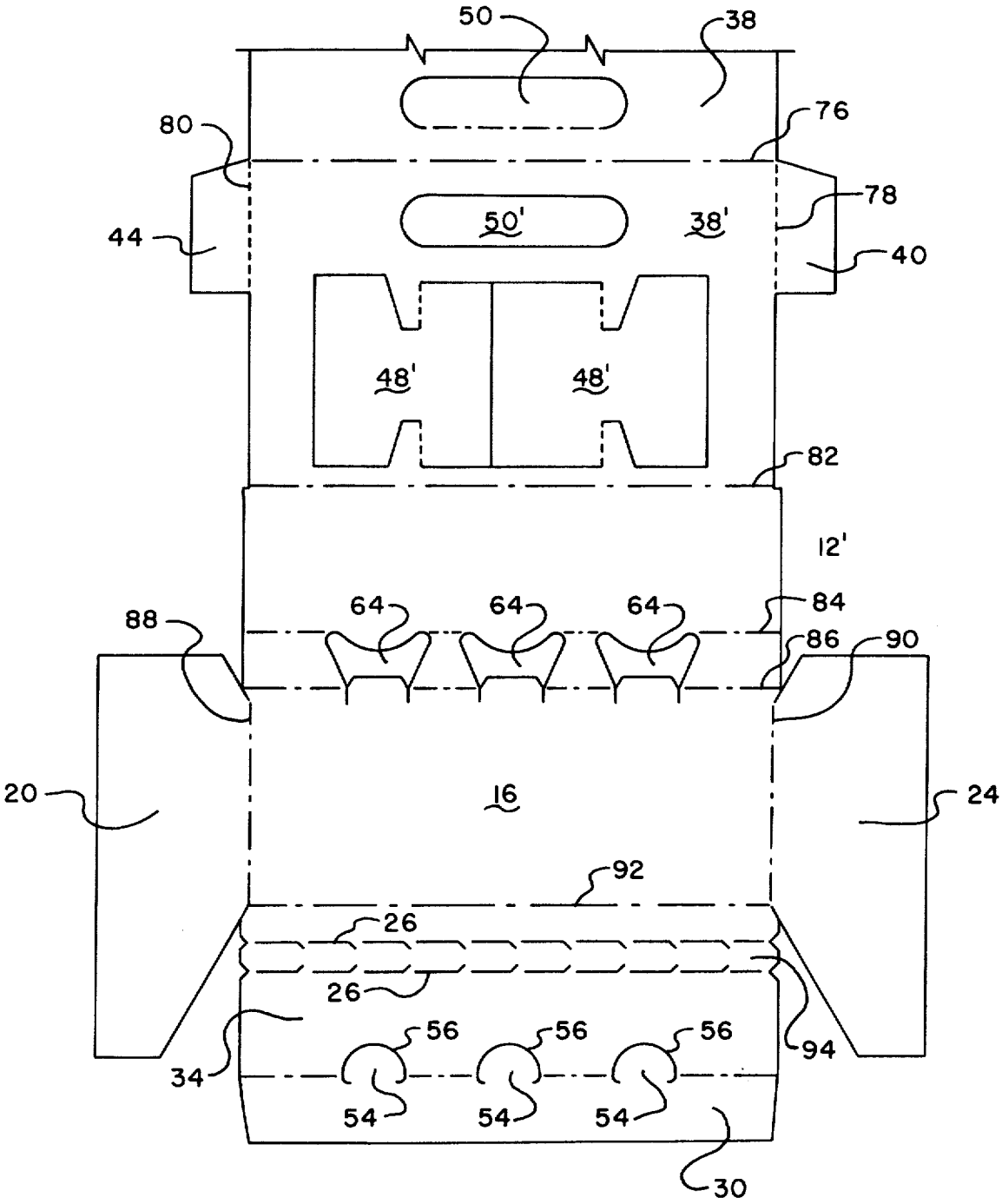
FIG. 7 is a partial plan view of approximately one-half of the production blank used in forming the one piece carrier shown in FIGS. 1 and 2.
Figure 8:
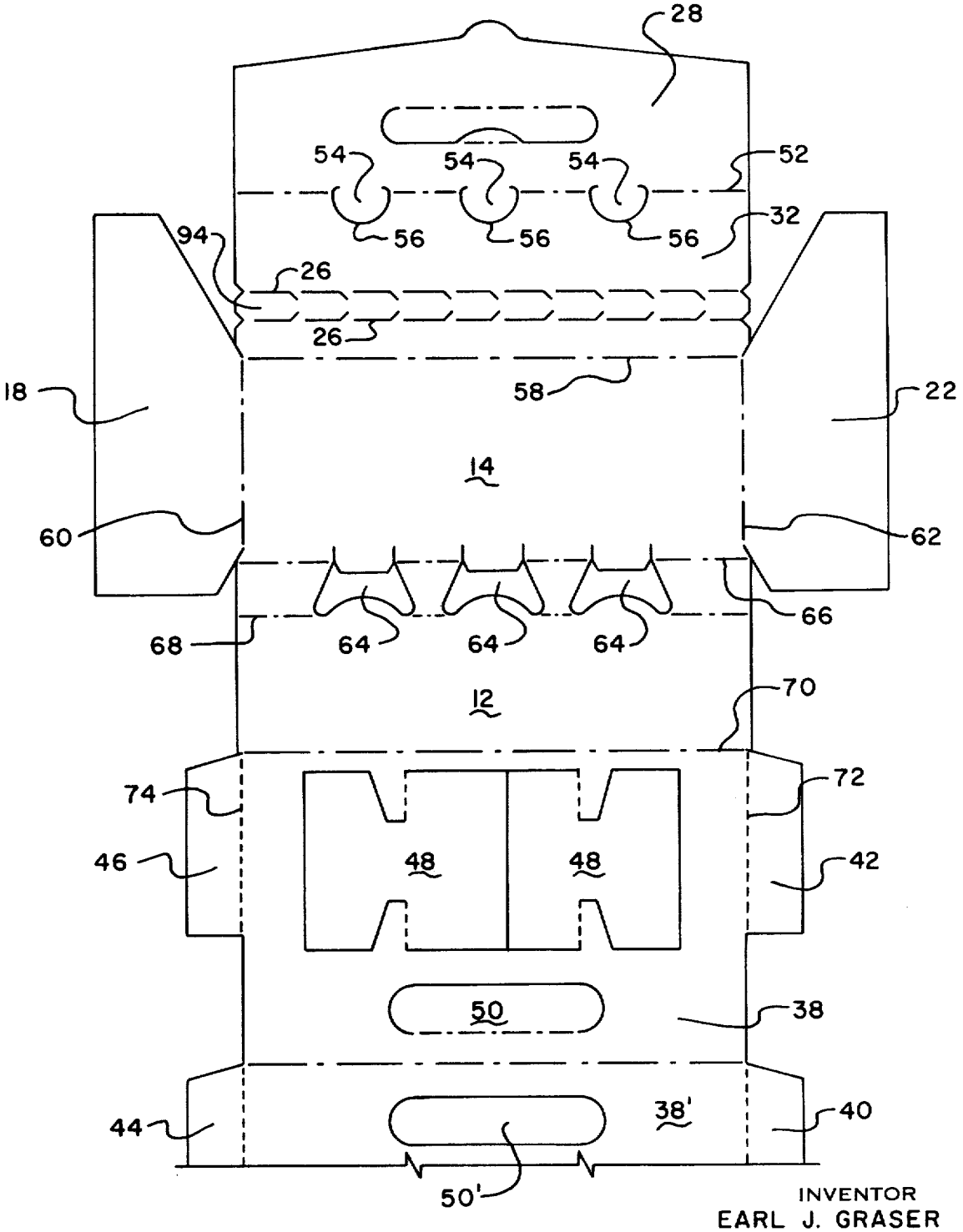
FIG. 8 is a partial plan view of the other half of the one piece production blank shown in FIG. 7.

Referring now to FIGS. 8 and 7 of the drawings respectively, there is shown in detail the production blank of the returnable wrap-around carrier shown in FIGS. 1 and 2 of the drawings and comprises the top panel 28 having a sloping side 32 formed thereon by means of the score line 52. Formed partially in the top panel 28 and its sloping side 32 are a plurality of caps 54 formed by means of the die cut 56. Located in the bottom portion of the sloping side 32 are the plurality of tear cuts 26 which serve as the means for removably detaching the top cover 28 with its sloping side 32 from the side panel 14. It should be understood that the tear cut removing means may be positioned anywhere within the sloping side 32 as well as within the top panel 28 without departing from the spirit and scope of the invention.

The side panel 14 is hinged by means of the score line 58 to the sloping side 32 as well as to the end panels 18 and 22 by means of the score lines 60 and 62. Formed in the lower portion of the side panel 14 is a plurality of bottle receiving openings 64 formed between a pair of score lines 66 and 68 in the configuration shown in the drawing. One-half of the bottom panel 12 is hinged to one-half of the central portion 38 by means of the score line 70, it being understood that the central partition 38 is formed in a double thickness as necessitated by this one piece construction. The central partition 38 also contains a plurality of tabs 42 and 46 formed on the outer sides thereof by means of the score line 72 and 74. These tabs serve as the means for rigidly fastening the bottom portion of the central partition to the end panels 18 and 22. The fastening means may be glue, staples, or other means well known in the art.

Figure 4:
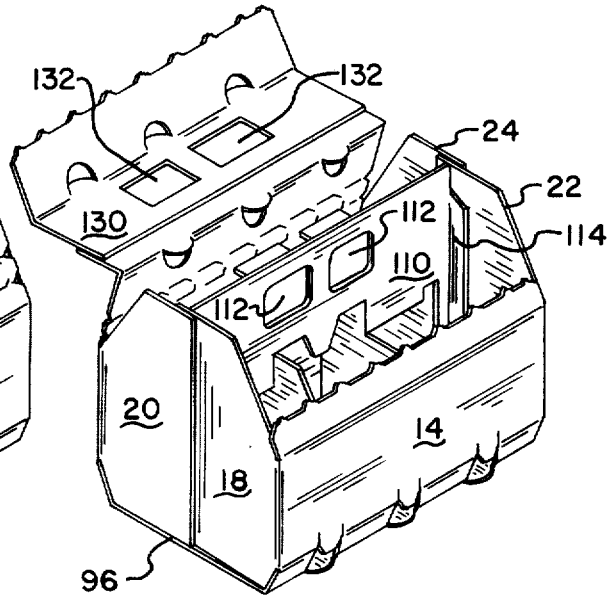
FIG. 4 is a side perspective view of the carrier shown in FIG. 3 showing the top panel partially torn off to expose the handle means formed on the upper portion of the central partition contained within the carrier.

Formed in the lower portion of the central partition 38 is a pair of butterfly panels 48 pivotally mounted so as to serve as partition dividers for the bottles contained within the package. Formed in the upper portion of the central partition 38 is the partition handle opening 50 which may be elongated as shown in FIG. 8 of the drawings or may be formed as two handle openings similar to the two piece embodiment shown in FIG. 4 of the drawings. For purposes of clarity and in order to better understand how the central partition 38 is formed in a double thickness, the drawing of the production blank has been shown in two figures (FIGS. 7 and 8) with the score line 76 representing the top of the central partition 38 about which the second half 38' of the central partition is folded. Referring now to FIG. 7 of the drawings, there is shown the remaining half 38' of the central partition 38 being hinged to the central partition 38 at the score line 76. The central partition 38' has formed in the upper portion thereof a partition handle opening 50' similar to the partition handle opening 50 in the central partition 38. Also formed on the outer edges thereof by means of the score line 78 and the score line 80 are a plurality of tabs 40 and 44 which serve as the means of anchoring the upper portion of the central partition 38 and 38' to the side panels 22 and 20.

Formed in the lower portion of the central partition 38' are a plurality of butterfly panels 48' similar to the butterfly panels 48 and serving the same purpose within the carrier. Hingedly attached at the score line 82 is the second half 12' of the bottom panel which is also hinged by means of the score lines 84 and 86 to the side panel 16. Also formed between the score lines 84 and 86 are a plurality of bottle receiving openings 64 which serve to receive the lower portion of the bottle contained within the carrier and prevent its sidewards movement during transportation of the carrier. The side panel 16 has formed on each side thereof an end panel 20 and an end panel 24 by means of the score lines 88 and 90 which are fixedly attached to the end panels 18 and end panels 22 by means of glue, staples, or some other means well known in the art. Hinged to the side panel 16 by means of the score line 92 is the sloping side 34 of the top panel 30 which also contains a plurality of tear cuts 26 located in the position shown in the drawings and for the purpose of removing the top panel from the carrier. Partially formed within the sloping sides 34 of the top panel 30 and within the top panel 30 are a plurality of caps 54 formed by means of the die cut 56.

When the carrier heretofore described has been formed into the one piece package shown in FIGS. 1 and 2 of the drawings and contains a plurality of bottles (not shown in the drawings for the purposes of clarity), then the purchaser of the carrier simply insets his fingers into the top handle opening 36 and through the partition handle opening 50 and transports the full carrier to his place of residence. In order to expose the bottles contained in the carrier and consume the contents thereof, the consumer simply tears off the top cover 28 and 30 with their sloping sides 32 and 34 by means of the elongated tab 94 formed by the tear cuts 26. The consumer may remove the entire top cover by pulling the tabs 94 contained on both sides of the container, or he may simply wish to leave the top cover intact on the carrier as shown in FIG. 2 by simply pulling one tab 94 to expose the bottles contained within the carrier. After the empty bottles have been replaced in the compartments within the carrier, the consumer may then fold over the top panel 28 and use the top panel handle opening 36 in conjunction with the partition handle opening 50 to return the carrier with the empty bottles back to the store for return of his deposit. If the consumer has completely torn off the top panel as beforedescribed, then the carrier becomes in effect a multi-cell basket carrier and the partition handle opening 50 would then be used to convey the carrier with its empty bottles back to the store. Thereafter the carrier may be reused by the bottler as a multi-cell basket carrier to other sources of supply where the wrap-around type carrier is not desired or necessary.

Referring now to FIGS. 3, 4, 5, and 6 of the drawings, there will be described briefly a modification of the subject invention wherein the new and novel returnable wrap-around carrier 10 may be formed in a two piece construction with the central partition being formed separate from the remainder of the blank. In describing the two piece construction, the details of the bottle receiving caps 54, the bottle receiving opening 64, and the function of the tear cuts 26 and the tab 94 will be omitted in the interest of brevity since they are located on the blank similar to the one piece production and performs the same function. In addition, the side panels 14 and 16 as well as the end panels 18, 20, 22, and 24 are formed and located in a manner similar to the one piece construction.

Figure 5:
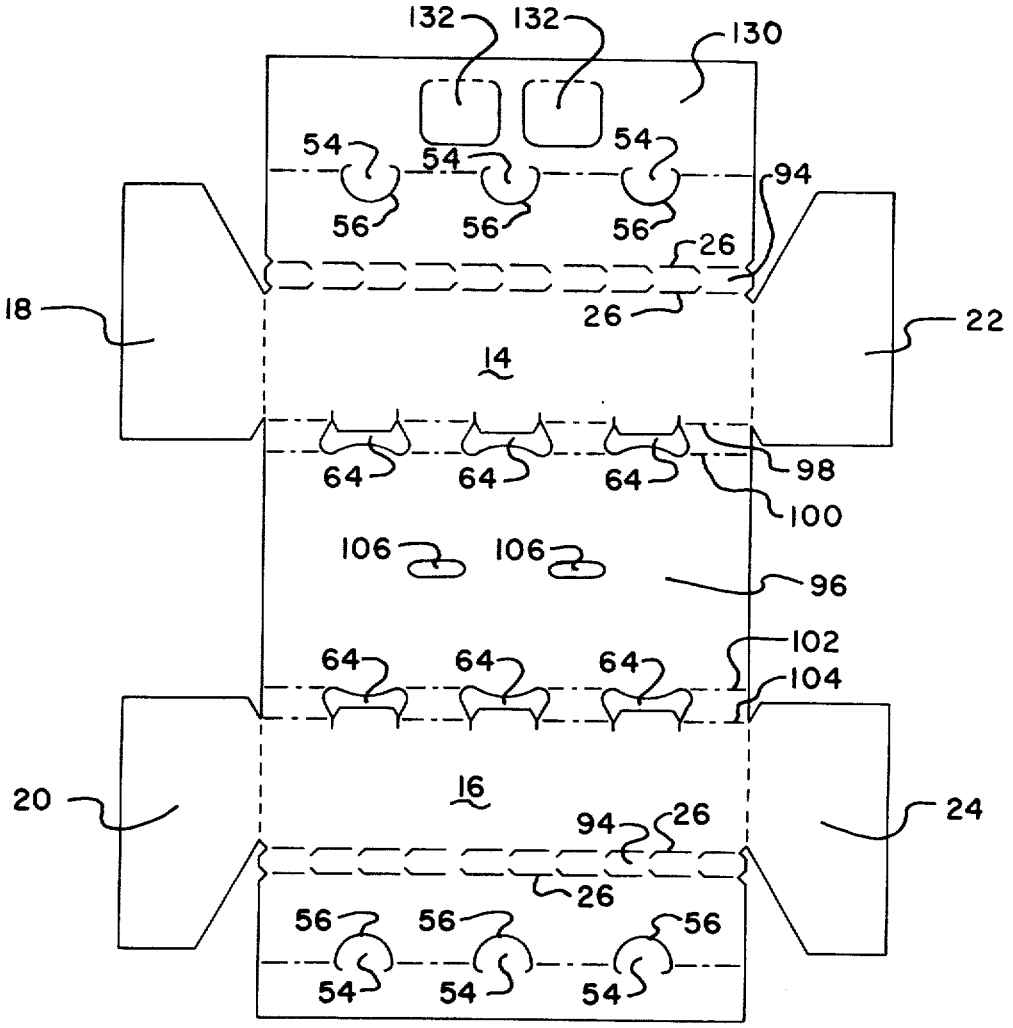
FIG. 5 is a top view of the production blank used in the formation of the two piece carrier shown in FIGS. 3 and 4.
Figure 6:
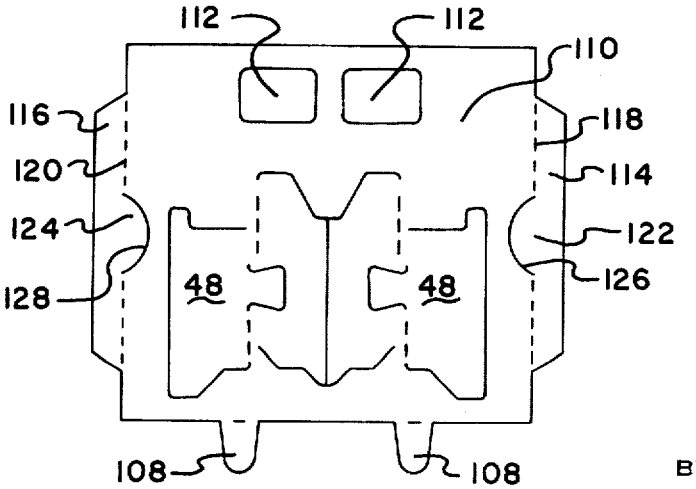
FIG. 6 is a plan view of the central partition as used in the two piece construction shown in FIGS. 3, 4, and 5.

The bottom panel 96 is hinged by means of the plurality of score lines 98, 100, 102, and 104 to the side panels 14 and 16 as shown in FIG. 5 of the drawing. Formed in the central portion of the bottom panel 96 are a plurality of tab receiving openings 106 which are designed to receive a plurality of tabs 108 formed in the separate central partition 110. It should be understood that in the two piece modification of the basic invention the central partition 110, while being formed separate from the basic blank, may be a single ply of paperboard or may be formed in a double thickness folded over in a manner similar to the central partition 38 and 38'. The central partition 110 also contains in the upper portion thereof a plurality of partition handle openings 112 which may be formed as two separate openings similar to that shown in FIG. 6 of the drawings or may be formed as an elongated opening similar to that shown in FIG. 2 of the drawings.

Also formed on the central partition 110 are a plurality of tabs 114 and 116 which *are* hingedly attached thereto by means of the score line 118 and 120. In addition there are formed a plurality of tabs 122 and 124 which are formed by means of the die cut lines 126 and 128. The tabs 114 and 116 are fixedly attached to the end panels 22 and 18 by means well known in the art, such as glue, staples, or the like. In addition, the tabs 122 and 124 are fixedly attached to the end panels 24 and 20 by the same means thereby rigidly fastening the separate partition 110 within the package. The tabs 108 are inserted through the tab openings 106 in the bottom panel and are rigidly attached thereto by glue, staples, or the like, thereby rigidly anchoring the bottom portion of the central partition 110 to the bottom panel 96. Formed in the top panel 130 is a plurality of top panel handle openings 132 similar in size and location to the partition handle openings 112. The use of the two piece carrier as well as the function of the handle openings is similar to that hereinbefore, in regard to the one piece construction, and will be omitted for the purposes of brevity.

From the foregoing, it should become clear that there has been provided by the subject invention a new and novel returnable wrap-around carrier having new and novel handle means for transporting the carrier with its full bottles from the store to the consumer and in addition to transport the converted carrier with its empty bottles back to the store for a return of the deposit. Thereupon the converted carrier can constantly be reused by the bottler as a standard multi-cell basket carrier.

Although only certain forms of the present invention are shown and described here in detail, other forms are possible and changes may be made in the arrangement and combination of the various parts of the invention and in the detail structure without departing from the spirit and scope of the invention. It is expressly understood that the invention is not to be limited to the preferred embodiment since it has been given by way of illustration only.

Having described my invention, I claim:

1. A returnable wrap-around carrier for a plurality of full or empty objects comprising:

a. a bottom [ panel ];

b. a pair of side [ panels ] *walls*, fixedly attached to opposite ends of said bottom [ panel ];

c. a pair of end [ panels ] *walls*, fixedly attached to said bottom [ panels ] and said side [ panels ] *walls;* d. a partition member, fixedly attached to said end [ panels ] *walls* and said bottom [ panels ], said partition member having formed on the upper portion thereof a partition handle opening; and e. a top cover having sloping sides attached to said side [ panels ] *walls* and having at least one tear cut opening means formed on the top cover and having formed in the central portion therein a top cover handle opening in proximity to said partition handle opening, said top cover handle serving as a means for transporting the carrier and the full objects from the store to the consumer, said tear cut opening means serving as the means for rapidly opening the carrier to expose the partition handle opening, and said partition handle opening serving as the means for transporting the carrier and the empty objects from the consumer to the store, thereby providing a returnable, reusable wrap-around carrier.

2. The returnable wrap-around carrier as defined in claim 1 wherein said tear cut opening means are positioned near the lower portion of the sloping sides of the top cover.

[ 3. The returnable wrap-around carrier as defined in claim 1 wherein said tear cut opening means are positioned near the central portion of the sloping sides of the top cover. ]

[ 4. The returnable wrap-around carrier as defined in claim 1 wherein said tear cut opening means are positioned near the top portion of the sloping sides of the top cover. ]

[ 5. The returnable wrap-around carrier as defined in claim 1 wherein said tear cut opening means are positioned on the non-sloping portion of the top cover in proximity to the top cover handle opening. ]

6. The returnable wrap-around carrier as defined in claim 1 further comprising said sloping sides *each* having formed thereon tear cut opening means positioned near the lower portion of the sloping sides of the top cover.

*7. A wrap-around carrier for a plurality of containers comprising:*

*a. a bottom;*

*b. a pair of opposed side walls attached to said bottom;*

*c. a pair of end walls attached to said bottom and said side walls;*

*d. an internal partition member attached to said bottom and said end walls and having a fixed upper portion; and*

*e. a top cover comprising a central portion and lateral portions connecting said top portion to said side walls, wherein at least the major portion of said top cover is detachably connected to said side walls, said partition member having a fixed handle defined by an opening provided in said upper portion of said partition member in proximity to but always below the central portion of said top cover, and the central portion of said top cover having at least one opening, the total length of said opening(s) spanning at least a length substantially equal to the width of the human hand and having a width along its total length greater than the thickness of the fingers of the human hand, through which said handle is accessible to the fingers of the human hand; said top cover opening and partition handle serving as the means for transporting the carrier and the full containers from a store to a consumer, and at least a major portion of said top cover serving as a means for rapidly opening the wrap-around carrier to completely expose the partition handle opening, the partition handle opening then serving alone as the means for transporting the carrier and the empty containers from the consumer back to the store, thereby providing a returnable, reusable wrap-around carrier.*

*8. A wrap-around carrier, according to claim 7, wherein both said openings are of at least generally the same size and configuration.*

*9. A wrap-around carrier according to claim 7, wherein said top cover is formed with the lateral portions thereof sloping downwardly from said central portion and is detachably connected to said side walls by tear strips defined by a plurality of tear cuts positioned in the lower lateral portions of said top cover.*

*10. A wrap-around carrier according to claim 7, wherein said top cover is detachably connected to said side walls by tear strips provided in said lateral portion of said top cover.*

*11. A wrap-around carrier according to claim 10, wherein said tear strips are a pair of opposed, parallel tear strips extending at least substantially the full length of the carrier.*

*12. A wrap-around carrier according to claim 7, wherein said partition member is formed integrally with the remainder of said carrier in a one piece construction.*

*13. A wrap-around carrier according to claim 7, wherein said bottom, said side walls, said end walls, and said top cover are formed from a single blank and said partition member is formed as a separate member attached to said bottom and said end walls.*

* * * * *

UNITED STATES PATENT OFFICE

CERTIFICATE OF CORRECTION

PATENT NO. : Re. 29,063

DATED : Dec. 7, 1976

INVENTOR(S) : Earl J. Graser

It is certified that error appears in the above-identified patent and that said Letters Patent are hereby corrected as shown below:

Column 5, Line 27, delete "insets" and insert in place thereof -- inserts --.

Column 8, Line 37, delete "portion" and insert in place thereof -- portions --.

Signed and Sealed this

Twenty-second Day of March 1977

[SEAL]

*Attest:*

RUTH C. MASON
*Attesting Officer*

C. MARSHALL DANN
*Commissioner of Patents and Trademarks*